United States Patent [19]
Salyer et al.

[11] Patent Number: 6,165,365
[45] Date of Patent: Dec. 26, 2000

[54] SHEAR LOCALIZED FILTRATION SYSTEM

[75] Inventors: David N. Salyer, Garden Grove; William A. Greene, Gardena; Kenneth W. Severing, LaHabra; Richard G. Hayes, Huntington Beach, all of Calif.

[73] Assignee: Spintek Systems, LP, Huntington Beach, Calif.

[21] Appl. No.: 08/290,244

[22] Filed: Aug. 15, 1994

[51] Int. Cl.[7] ............................ B01D 61/00; B01D 63/08
[52] U.S. Cl. ............... 210/650; 210/321.75; 210/321.84; 210/321.67; 210/321.69; 210/360.1; 210/232; 210/346; 210/107
[58] Field of Search ..................................... 210/334, 324, 210/330, 331, 332, 359, 360.1, 367, 321.69, 321.75, 321.84, 346, 321.67, 90, 107, 333.01, 650, 232

[56] References Cited

U.S. PATENT DOCUMENTS

| | | | |
|---|---|---|---|
| 2,408,130 | 9/1946 | Vokes | 210/334 |
| 2,630,228 | 3/1953 | Wright et al. | 210/346 |
| 3,591,009 | 7/1971 | Luthi | 210/331 |
| 3,884,805 | 5/1975 | Bagdasarian | 210/334 |
| 3,984,317 | 10/1976 | Donovan | 210/415 |
| 3,989,629 | 11/1976 | Donovan | 210/298 |
| 4,025,425 | 5/1977 | Croopnick . | |
| 4,036,759 | 7/1977 | Donovan | 210/320 |
| 4,626,351 | 12/1986 | Fuhring | 210/334 |
| 4,728,424 | 3/1988 | Miura | 210/345 |
| 4,894,155 | 1/1990 | Leoncavallo et al. | 210/321.84 |
| 4,936,990 | 6/1990 | Brunsell et al. | 210/331 |
| 4,975,188 | 12/1990 | Brunsell et al. | 212/360.1 |
| 5,111,458 | 5/1992 | Greene | 210/330 |
| 5,228,993 | 7/1993 | Dori | 210/107 |
| 5,275,725 | 1/1994 | Ishii et al. | 210/321.67 |

*Primary Examiner*—Ana Fortuna
*Attorney, Agent, or Firm*—Leon D. Rosen

[57] ABSTRACT

A filtration apparatus is provided, of the type that includes a stack of rapidly rotating membrane packs (32, FIG. 2) and a stack of stationary separator elements (36A, 36B) interleaved with the membrane packs to leave thin gaps (40A, 40B) between them, which obtains the advantages of both series-connected and parallel-connected systems. A feed conduit (82) connects the radially outer ends (110) of the gaps, to carry feed fluid into and out of each gap. The rapidly rotating membrane packs cause radially outward flow (94, FIG. 5) near their surfaces, which causes radially inward flow (102) near the surfaces of the stationary elements, to cause fluid flow radially inwardly and then outwardly through each gap. The system is operated so particles (111, FIG. 6) of the feed fluid can build up on the rotating pack surfaces (92) only to a thickness that is much less than one-half the thickness (116) of the gap, before commencing any procedure to clean the membrane pack surfaces. The stationary elements have apertures to equalize the pressure on opposite sides thereof and to promote fluid shear at the membrane surfaces. Permeate migrating into the membrane packs flows radially inwardly to a hollow shaft (50, FIG. 2), with the permeate flowing in opposite axial directions (A, B) along the shaft. An accumulator (140, FIG. 1) is coupled to the feed inlet (12) to maintain feed fluid pressure during an abnormal loss of feed fluid pressure, for the time required to stop rotation of the stack of membrane packs.

18 Claims, 4 Drawing Sheets

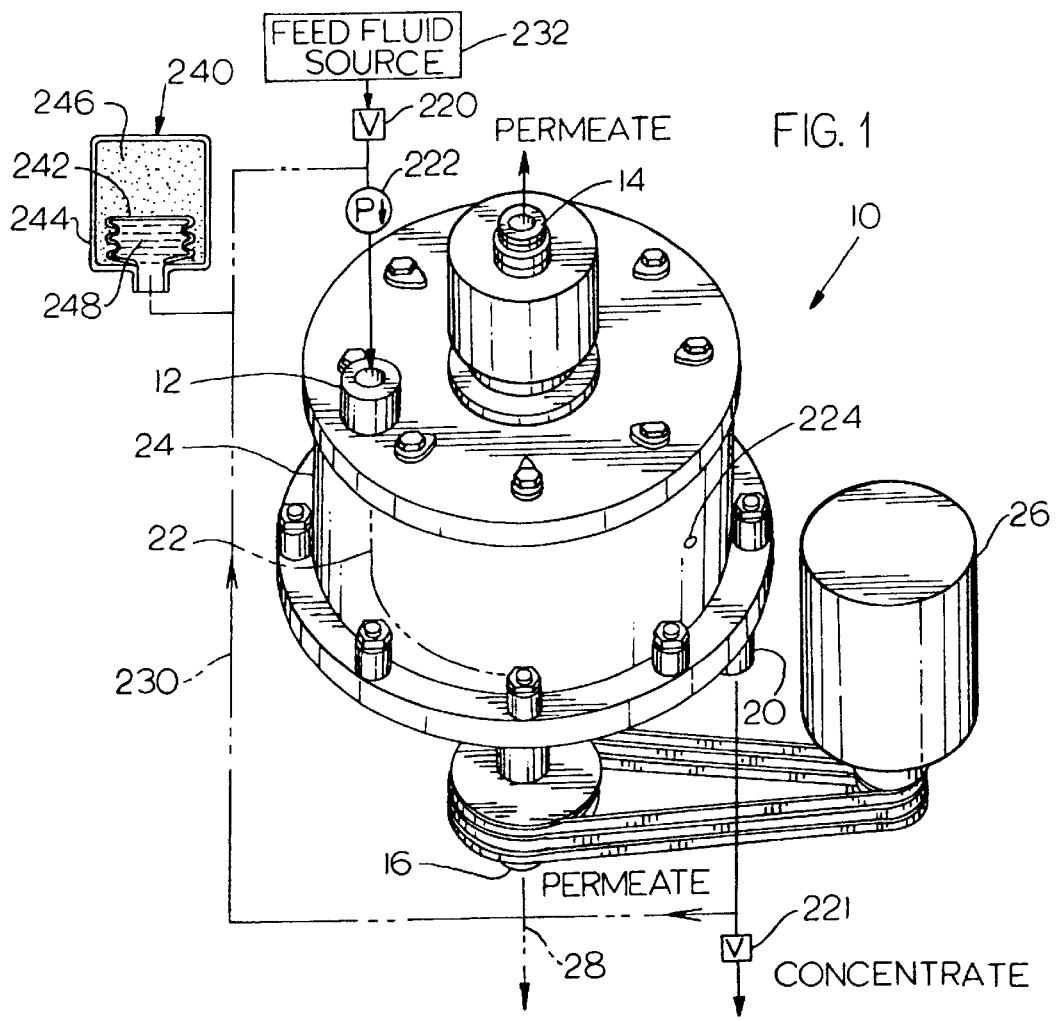
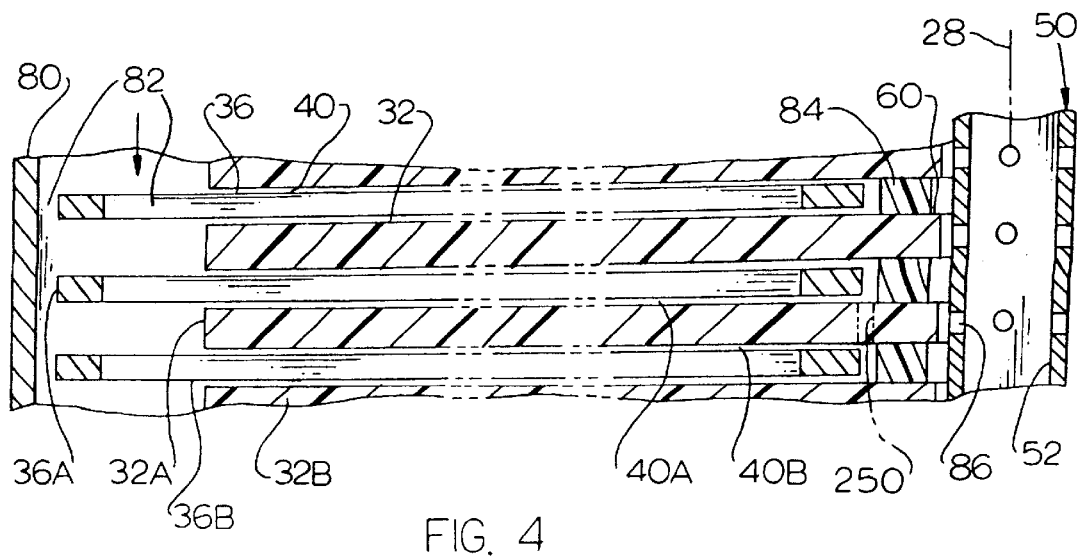

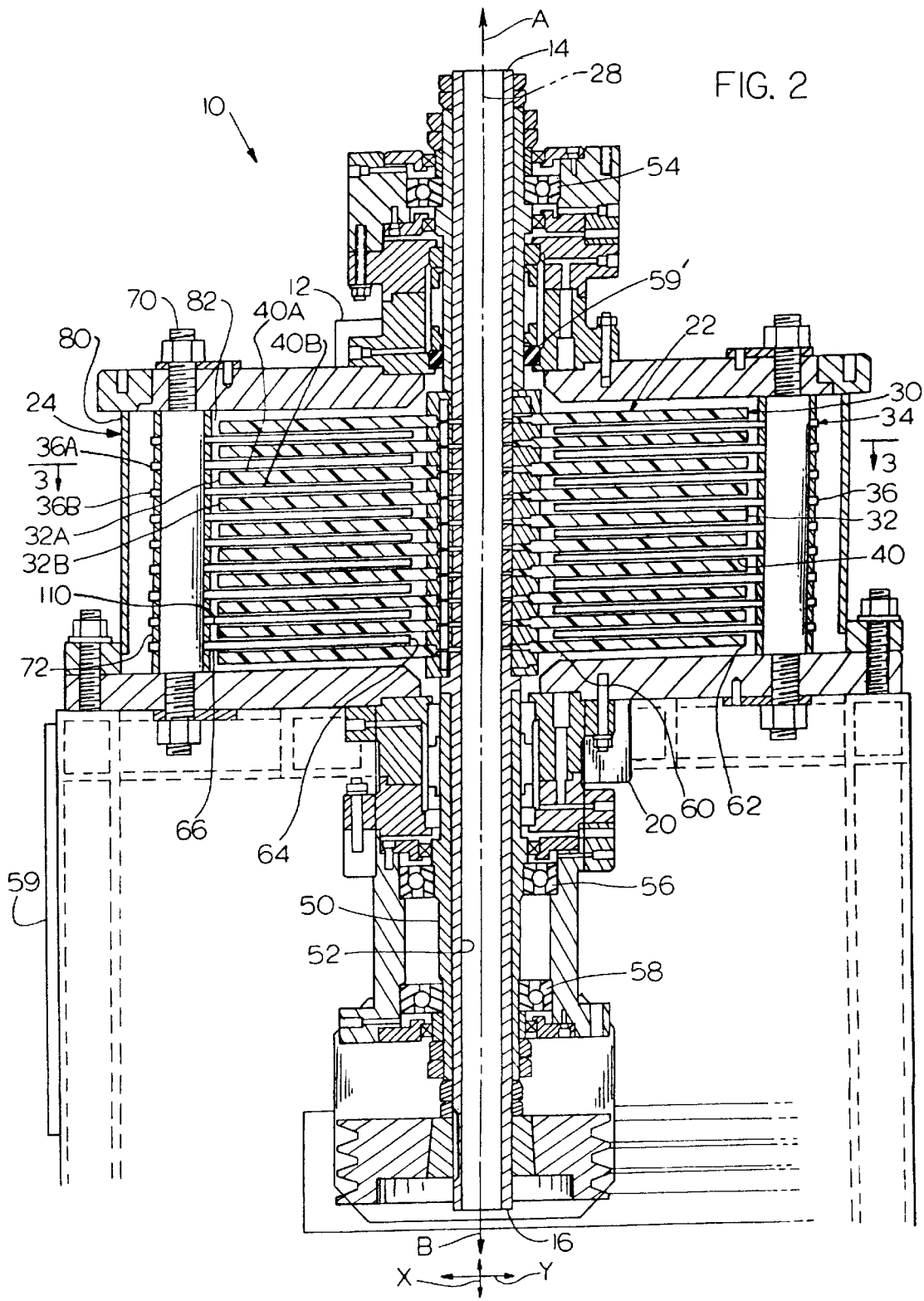

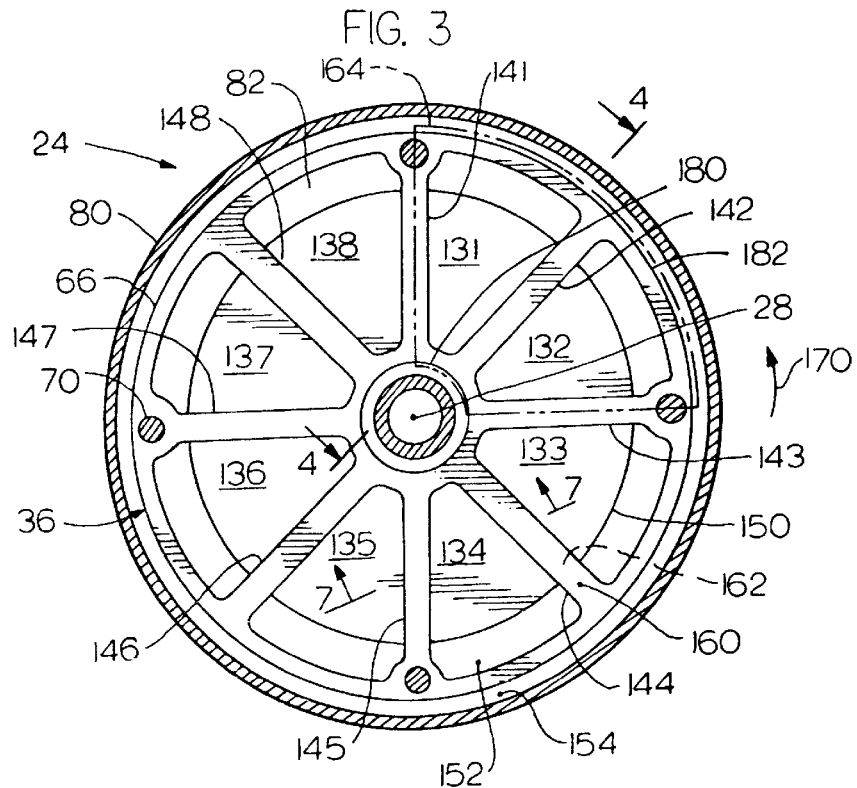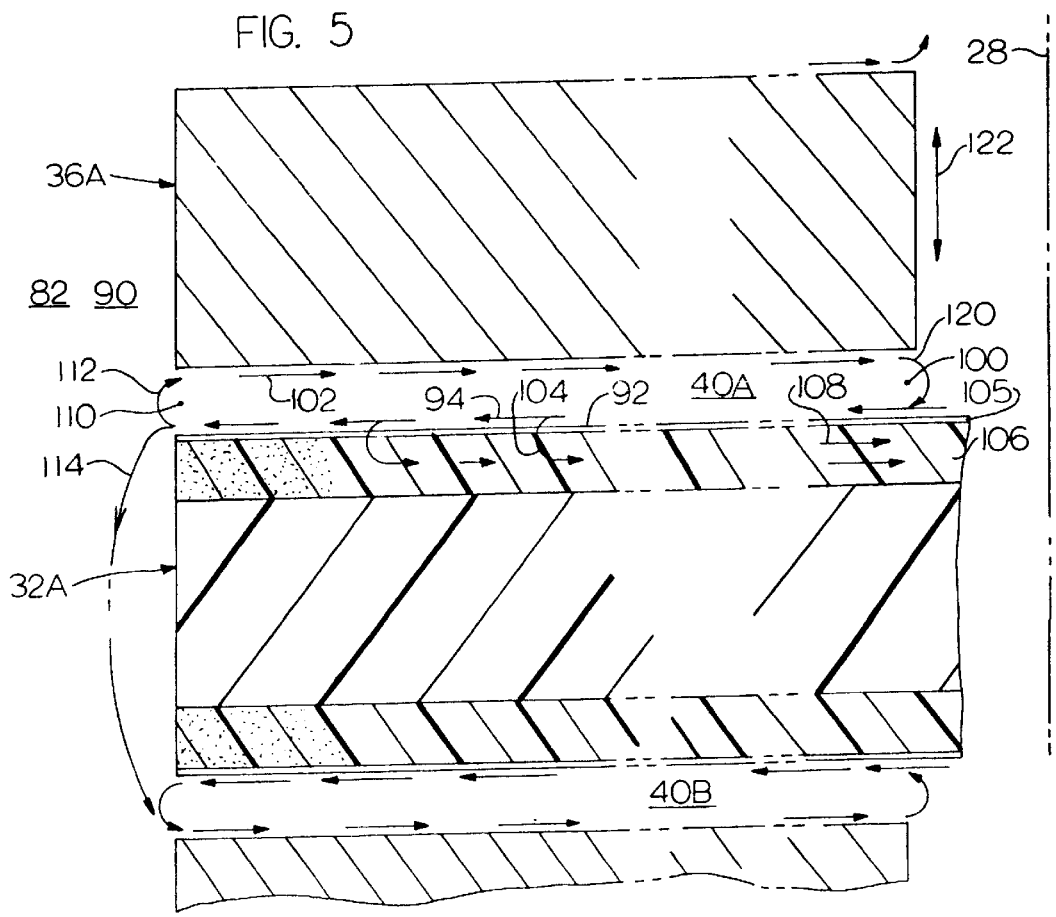

SHEAR LOCALIZED FILTRATION SYSTEM

BACKGROUND OF THE INVENTION:

A feed fluid such as waste water, can be separated into permeate, such as pure water which passes through a membrane, and concentrate which includes water with a high concentration of particles. Such separation can be accomplished by the use of a stack of membrane packs lying within a container. Fouling of the membrane packs, by the buildup of particles at the surface which block pores of the membranes, can be reduced by rapidly rotating the membrane packs, as described in U.S. Pat. No. 4,025,425 by Croopnick. Fouling can be further reduced by placing stationary separator elements between pairs of membrane packs, to create turbulence in the gap between the rotating surface of the membrane pack and the stationary surface of the separating element. It is noted that when a membrane pack has large pores (many microns wide), it may be referred to as a filter pack, but applicant uses the term membrane pack herein for both.

The turbulence-enhancing separator elements lying between membrane packs should be relatively thin to take up little space for a high density of filtration or membrane pack surface. However, the separator elements must not touch the rapidly rotating membrane packs or they will destroy them. It would be desirable if the separator elements could be designed for maximum strength against deflection while minimizing conditions that could cause their deflection.

A common filtration construction directs the feed fluid in series through the gaps. For example, if there is a stack of fifty membrane packs and corresponding stationary elements to produce one hundred gaps, the fluid may flow in a series serpentine path through the one hundred gaps. Such serial flow has the advantage that the feed fluid moves along a long path in contact with the surfaces of the membrane packs, to remove a considerable portion of the filtrate. However, such serial flow has a disadvantage that the feed fluid is not homogeneous, in that the concentration of particles in the feed fluid may increase by many times between the upstream and downstream ends of the feed fluid path. Also, there can be a large pressure drop along the long path, due to friction applied to the moving feed fluid, especially for more viscous liquids. Such large pressure drop can result in the feed fluid pressure being optimum (for maximum permeate flow through the membranes while minimizing fouling) at only a small portion of the total feed fluid path. The flow of the feed fluid in parallel through all of the gaps is seldom used, because the short path length requires repeated return of the fluid for reflow, resulting in large pressure losses during flow near the center of the rotor. A filtration system which allowed the feed fluid to flow along a long path in contact with the membrane surfaces while maintaining the feed fluid largely homogeneous in pressure and particle concentration, would be of value in the filtration of a wide variety of fluids.

SUMMARY OF THE INVENTION

In accordance with one embodiment of the present invention, a filtration system is provided, of the type wherein a stack of rotatable membrane packs is spaced by separator elements to leave gaps through which feed fluid moves, which produces enhanced filtration. A filtration system is operated so the feed fluid is flowed into a conduit that connects the radially outer edges of the gaps that separate the rotating membrane packs from the substantially stationary separator elements. Portions of the feed fluid flow largely radially inwardly along inward paths that lie adjacent to the stationary elements, and flow largely radially outwardly along outward paths that lie adjacent to the rotating membrane packs, to produce a largely circulating flow along each gap. Portions of the fluid that have moved radially inwardly and outwardly along a path, pass into the feed conduit to move to another gap, while other portions move back into the same gap along the inward paths. The feed fluid moves along a long path in moving into and out of each of the gaps and flowing radially inwardly and outwardly along each gap, and yet a substantially homogenous feed fluid is maintained because fluid in each gap is constantly mixed with fluid from other gaps by way of the feed conduit.

As the feed fluid moves through the gaps, permeate of the feed fluid passes through membranes of the membrane packs and moves out of the apparatus. The centrifugal force and large shear (difference in fluid velocity near the pack surfaces) minimizes the buildup of particles at the membrane surface which would clog its pores. The stationary separator elements have apertures to leave spokes, which helps create shear and which equalize pressure on opposite faces of the elements. The membrane packs are cleaned before the buildup of particles is more than one-tenth the thickness of the gap, and usually before the membrane surface is completely coated with particles to a depth of more than an average of one particle thickness. An accumulator is preferably connected to the feed conduit, as at the feed inlet. Such accumulator assures that the feed fluid pressure can only gradually decrease, to prevent blowout of the membranes as the membrane packs stop rotating in the event of loss of feed fluid pressure.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a rotary filtration apparatus constructed in accordance with one embodiment of the present invention.

FIG. 2 is a sectional side view of the apparatus of FIG. 1.

FIG. 3 is a view taken on the line 3—3 of FIG. 2.

FIG. 4 is a sectional view of a portion of the apparatus of FIG. 2, taken on the line 4—4 of FIG. 3.

FIG. 5 is an enlarged view of a portion of the apparatus of FIG. 4.

DESCRIPTION OF THE PREFERRED EMBODIMENTS

Figure 6:
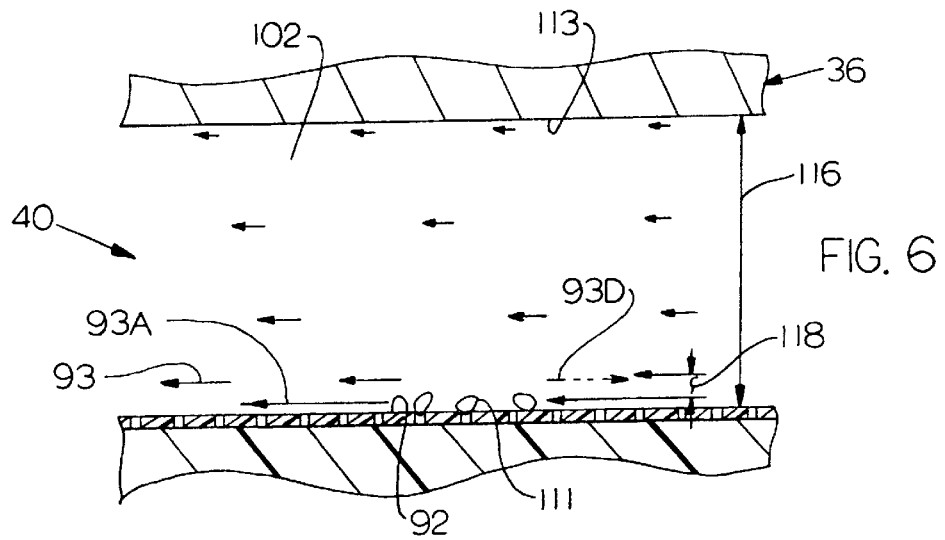
FIG. 6 is an enlarged view of a portion of the apparatus of FIG. 5.

FIG. 1 illustrates a rotary filtration apparatus 10 which has a feed fluid inlet 12 for receiving feed fluid. The feed fluid generally includes a liquid, and particles in the liquid which are of micron size (average diameter less than ten microns) or submicron size. The apparatus separates the feed fluid into filtrate, or permeate which flows out of permeate outlets 14, 16, and concentrate which flows out of an outlet 20 (or out of an inlet 12 in the case of batch processing). Concentrate comprises liquid with a high concentration of particles, and is left after much of the permeate in the original feed fluid has been removed. The apparatus includes a rotor 22 which lies within a sealed container 24. A motor 26 is coupled to the rotor to rapidly rotate it about an axis 28.

As shown in FIG. 2, the rotor 22 includes a stack 30 of axially-spaced (in direction X that is parallel to the axis) membrane packs 32 that lie within the container. The apparatus also includes a stack 34 of plate-like separator elements 36. The separator elements 36 are stationary, and positioned so a separator element 36 lies between each pair of membrane packs 32. This leaves gaps 40 between each surface of the membrane pack and adjacent surfaces of separator elements. The gaps extend radially (parallel to radial directions Y), in that they have large radial dimensions Y and short axial dimensions X. In particular, FIG. 2 shows first and second membrane packs 32A, 32B and shows separator elements 36A and 36B and shows first and second gaps 40A, 40B on opposite sides of the first membrane pack 32A.

FIG. 2 shows that the membrane packs 32 are mounted at their axial middles on a shaft 50 which is hollow to form a permeate conduit 52. The permeate conduit extends through the entire length of the shaft, to form the permeate outlets 14, 16 at the shaft opposite ends. The shaft is rotatably mounted on bearing 54, 56, 58, with a stand indicated at 59 to support the lower bearings, and with the upper bearing supported on the container 24. It is possible to rotatably support the rotor on a bearing assembly that includes a single bearing.

The membrane packs 32 have radially inner and outer ends 60, 62. The inner ends 60 are mounted on the shaft, while the outer ends 62 are free and therefore unsupported. The separator elements 36 have radially inner and outer ends 64, 66. The outer ends 66 are mounted on a group of tie rods 70, and are spaced apart by spacers 72. The radially inner ends 64 of the separator element are free and therefore unsupported.

As shown in FIG. 3, each of the separator elements 36 has through apertures 131–138 that leave spokes 141–148. The apertures extend radially (away from axis 28) further than the peripheries 150 of the membrane packs. This leaves spaces 152 at the radially outer portions of the apertures, along which feed fluid can move. Also, the radially outer ends 66 of the separator elements are radially spaced from the sidewalls 80 of the container 24. This leaves additional space 154 along which feed fluid can move. The spaces 152, 154 form a feed conduit 82, the conduit 82 being of largely toroidal shape (with the peripheries of the spacer element lying in it).

As shown in FIG. 4, the cross sectional area of the feed conduit 82, as seen in the sectional view of FIG. 4, is much greater than that of any of the gaps 40. As a result, the feed fluid tends to be substantially homogenous throughout the filtration apparatus, in that there is a substantially uniform pressure of the feed fluid and a substantially uniform concentration of solids in the liquid of the feed fluid. It is noted that the radially inner ends 60 of the membrane packs are spaced apart by seal spacers 84. Permeate flows radially inwardly along each membrane pack, and through holes 86 in the rotor shaft and along the permeate conduit 52 of the shaft.

FIG. 5 illustrates the flow of fluids in the gaps such as 40A and 40B and along the feed conduit 82. Before the membrane packs such as 32A begin to rotate, feed fluid 90 fills the feed conduit 82 and the gaps such as 40A, 40B. When the membrane pack 32A is rapidly rotated, fluid lying adjacent to the membrane pack surface 92 rotates with the membrane pack. Such rotation results in centrifugal force which causes feed fluid lying adjacent to the surface 92 to move radially outwardly along an outward path 94 (which also includes circumferential components in the direction of membrane pack rotation). The radially outward flow along outward paths 94 results in a lower pressure at the radially inward end 100 of the gap, and this causes a radially inward flow of feed fluid along inward paths 102. The result is that there is a circulating flow of feed fluid along each gap. This circulating flow causes fresh feed fluid from the feed conduit 82 to repeatedly flow across the membrane pack surface 92. Permeate of the feed fluid moves along membrane-crossing paths 104 through a membrane 105 or other filtering element into porous backup sheets 106 of the membrane packs, and in inward directions at 108 to the centers of the pack from which the permeate is removed.

It should be noted that the membrane or filtering element may be a polymeric membrane, a screen (woven or matt or etched), a porous ceramic, a sintered metal, or other construction that passes only small particles or molecules. Applicant uses the term "membrane pack" for all of such elements. Common processes include dialysis, electrodialysis, reverse osmosis, and various size filtration. Applicant's system is especially useful for microfiltration and is useful for ultrafiltration, although it possibly can be used for nanofiltration and even possibly for reverse osmosis.

At the radially outer ends 110 of the gaps, fluid moving along the outer paths 94 is mixed with the feed fluid, and some of the fluid (at least one percent) that has moved along the outer paths 94 is returned as indicated by path 112, while some of it (at least one percent) is moved into the feed conduit as indicated by path 114. The fluid that is not recirculated within the same gap 40A, can move along the feed conduit 82 and into another gap such as 40B. At the gap inner end 100, much of the fluid passes in a loop indicated at 120 back along the gap. Some of the fluid passes in paths 122 between adjacent gaps such as 40A and 40C, but since there is substantially the same pressure at the radially inner ends of both gaps 40A, 40C, there is little flow in the directions 122.

FIG. 6 indicates the velocity profile, in a circumferential direction, (the radial velocity component is not shown) of feed fluid passing along a gap 40, by the length of the arrows. The circumferential direction is perpendicular to the radial direction and is parallel to the membrane pack surface motion. The path at 93A is very close to the membrane pack surface 92, and the fluid moves at almost the same speed as the rotating surface 92. The velocity at path 93 is much less than the velocity at 93A, and the difference component 93D tends to sweep away particles 111 from the surface 92 of the membrane pack. This phenomenon can be referred to as the localized shear that tends to sweep particles from the surface. The magnitude of such shear, for a given velocity of the surface 92 with respect to the stationary separator element surface 113 of the separator element, depends upon the thickness 116 of the gap. The smaller the thickness 116, the greater the localized shear effect, or ratio of velocity difference 93D with distance 118 along the gap. Applicant prefers to make the gap 116 as small as possible, but must prevent the surfaces 92, 113 from touching since this could cause damage to the membrane pack. Applicant is able to obtain a gap thickness 116 of about two millimeters without causing membrane pack damage in a stack of many tens of membrane packs. In addition to the velocity differential per unit distance, the small gap results in large turbulence at the surfaces, and such turbulence near surface 92 also tends to sweep away particles that might otherwise block the pores of the membrane. It is noted that the large circumferential fluid movement at 93A and 93 results in fluid near the membrane pack flowing radially outwardly.

Thus, by applicant connecting a feed conduit to the radially outer ends of the gaps between membrane packs and separator elements, applicant causes a recirculating flow through each of the gaps, wherein feed fluid moves radially inwardly near the surface of the separator member and radially outwardly near the surface of the filter packs. Feed fluid moving largely radially outwardly near the outward ends of the gaps, flows into the feed conduit and also recirculates. With fluid circulating, perhaps several times, through many gaps, applicant obtains the advantages of a serial connection of the gaps of having each quantity of fluid move along many membrane pack surfaces to remove a large proportion of the filtrate from the feed fluid. Applicant avoids disadvantages of a serial connection, because the present system results in a substantially homogenous fluid throughout the apparatus, in that the pressure is about the same everywhere and the mixing of fluid near the outer ends of the gaps results in the feed fluid everywhere having about the same concentration of solids. As discussed above, the substantially uniform pressure allows applicant to apply an optimum pressure to the feed fluid. For example, in one situation, a pressure of 40 psi will produce a high flow of permeate into the membrane packs while obtaining minimal fouling of the membrane packs, while a pressure of 80 psi could cause fouling and a pressure of 20 psi could result in a low permeate flow rate. The optimum pressure depends upon the concentration of solids. Applicant can adjust the rate at which concentrate is drawn off, based on the permeate flow, to vary the concentration of solids so as to minimize membrane fouling while still obtaining a considerable permeate flow.

As shown in FIG. 3, applicant prefers to construct each separator element 36 with apertures 131–138, to leave spokes 141–148 that form wall portions on circumferentially (perpendicular to a radial line) opposite sides of each aperture. One advantage of the apertures is that they result in the same pressure on opposite faces 160, 162 of the element. Applicant prefers that the membrane packs have a small thickness such as 8 mm, and that the spacer elements have a small thickness such as 6 mm, with the gaps each having a thickness such as 3 mm, for a system using membrane packs of 16 inches (41 cm) diameter. The small thickness of a spacer element would allow locations on it to be axially deflected, when there was a small pressure difference between its opposite faces. Any such axial deflection which results in direct contact of a spacer element with a rapidly rotating membrane pack, would cause destruction of that membrane pack. By providing at least one aperture in each imaginary 90° sector 164 of a separator element, and with the apertures occupying at least 10% of the area of each spacer element and of each sector and separator walls (e.g. spokes) lying in each sector, applicant avoids such a pressure difference.

Figure 7:
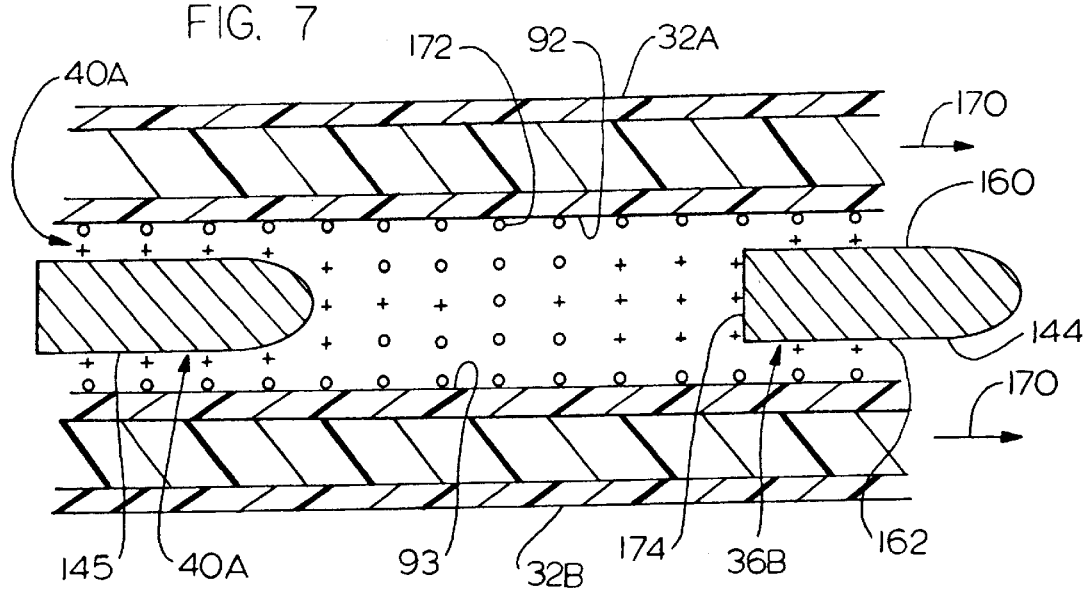
FIG. 7 is a view taken on the line 7—7 of FIG. 3, but with the axial dimension exaggerated, and with pluses (+) indicating flow into the paper and circles indicating flow out of the paper.

When the membrane packs rotate so portions shown in FIG. 7 move in the circumferential directions of arrows 170, feed fluid at 172 lying adjacent to the pack face 92 also moves circumferentially. Applicant constructs each spoke such as 144, 145 with a leading edge 174 that is designed to interfere with circumferential fluid movement. The result is a large change in fluid velocity over a short distance near the membrane pack face, which helps sweep away particles.

The flow near the membrane packs is usually turbulent, and the separators can be referred to as "turbulators". Of course, in the absence of a separator, the fluid between a pair of membrane packs would soon rotate with the packs. With the separators, most of the fluid is static or only slowly rotating, which results in a rapid change in velocity near the membrane packs. The cross section of each spoke such as 144 in FIG. 7 (in which the thickness is exaggerated) is selected so the spoke is self-centering. That is, if the spoke approaches the face 93 of one membrane pack, the reaction of the spoke with fluid moving in the circumferential direction 170 is to move the spoke away from the membrane pack surface 93.

Applicant has experimented with spacer elements having different numbers of spokes. It was found that an element such as shown in FIG. 3, which has eight spokes, was best in the tests. An element with four spokes operated almost, but not quite, as well. The number of spokes is preferably at least four but not more than sixteen. The radially inner ends of the spokes are tied together by a 360° continuous hub 180. The radially outer ends of the spokes are preferably tied together by a continuous rim 182, although this is not absolutely necessary. The apertures and spokes can be angled from a radial direction.

The membrane packs are rotated rapidly enough that large centrifugal forces and large shear is created to avoid membrane fouling. Membrane packs of 16 inch diameter, are rotated at at least 200 rpm, and usually at about 760 rpm to 1000 rpm. At 200 rpm, the average surface velocity (at a point four inches from the axis) is about 2 meters per second. Thus, the system operates with an average membrane pack velocity of at least 2 meters per second, and a velocity at the pack periphery of at least 4 meters per second. The most effective rotational speeds for membrane packs usually create centrifugal forces that increase pressure by at least 20 psi.

The rotary filtration apparatus 10 (FIG. 1) can be operated in a batch or continuous process, or in a combination. In a batch process, feed fluid with a predetermined concentration of solids, such as 200 ppm (parts per million) is pumped into the container. Inlet and outlet valves 220, 221 are closed. A pump 222 may be connected to a recirculation conduit 230 to maintain a more uniform concentration of particles, although this can be accomplished within the container 24 (e.g. by dividing the toroidal feed conduit 82 of FIG. 3 into two parts and pumping fluid up in one part and down in the other). The inlet and outlet 12, 20 form axially spaced locations of the feed conduit, and the recirculation conduit 230 lies outside of the feed conduit. A sensor 224 is connected to the container to sense the concentration of particles. The motor 26 is energized so the rotor 22 rotates at a predetermined speed, and permeate is constantly drawn from the feed fluid, while the concentration of particles in the feed fluid increases. The sensor 224 senses this, and can control the pump 222 to change the pressure of the feed fluid, and also control the motor 26 to change the speed of rotation of the rotor, for optimum conditions (large permeate flow into the membrane pack and low fouling of the membrane pack surfaces). In a continuous process, feed fluid can flow from a source 232 continually, though at a slow rate, into the feed fluid inlet 12. Concentrate flows out of the outlet 20, for use or for further processing.

It is noted that in some prior art filtration systems, particles of concentrate were allowed to mechanically build up to a large thickness (a plurality of particles thick) on the filter or membrane surface. In the present invention only "fouling" which is a chemical phenomenon, rather than "buildup" which is a mechanical phenomenon occurs. In fouling, solutes (particles) are absorbed or adsorped to the membrane by chemical attraction, to the point where permeate flow through the membrane is significantly reduced. Fouling occurs both at the surface and below it. For example, very small particles can cling to the walls of membrane pores until the particles close the pores, causing permeate flow to stop and fouling to occur. The thickness of particles fouling a membrane will be less than one-tenth the gap width, when cleaning must start.

The present invention can prevent any build up, and also reduces the rate of fouling. Selection of the proper membrane material for a particular application is of great importance in reducing the rate of fouling. Once fouling occurs, the membrane can be cleaned as by the use of chemicals to dissolve or loosen particles that have adhered to the interstices of the membrane. Measurement of the permeate flow rate enables a determination of the degree of fouling and indicates when cleaning is needed.

Applicant prefers to connect an accumulator 240 (FIG. 1) to the feed conduit 80 at all times. The accumulator assures that the pressure of feed fluid will change only slowly, despite a possible interruption of supply or other phenomenon that might rapidly decrease feed fluid pressure. If the feed fluid pressure should suddenly fall, but the pressure of permeate in the membrane packs falls only slowly, then the larger pressure of permeate in the membrane packs could cause the thin membranes to burst. The accumulator 240 is of a common type, which include a membrane, bellows, or piston divider member 242 lying in a container 244, and separating the container into an air chamber 246 that contains air under pressure, and a liquid chamber 248 that contains liquid under the same pressure. Any other means for maintaining feed fluid pressure, such as a valve connected to a high pressure liquid source such as a city water main, and opened only when a rapid pressure drop is sensed, can be used. When the accumulator must pump fluid for more than a very short time, as when it is almost empty after being full, the motor is preferably automatically deenergized. The rotor will substantially stop from perhaps 700 rpm, in a period such as eight seconds, and the fluid pressure should be maintained during perhaps six of those seconds.

FIG. 2 shows that permeate exits the apparatus in opposite directions A, B through opposite ends of the shaft at 14 and 16. Where there is a large filtrate flow, this allows for the use of a smaller shaft and bearings 54, 56, 58 and seals such as 59', which reduces cost.

FIG. 4 indicates that holes 250 can be formed in the radially inner ends of the membrane packs to allow feed fluid to flow largely axially from one gap to another at their inner ends. However, there would be only small flow through such a hole, and providing such a hole can increase the cost of the membrane pack because of the need to seal against the migration of feed fluid into the permeate.

Figure 8:
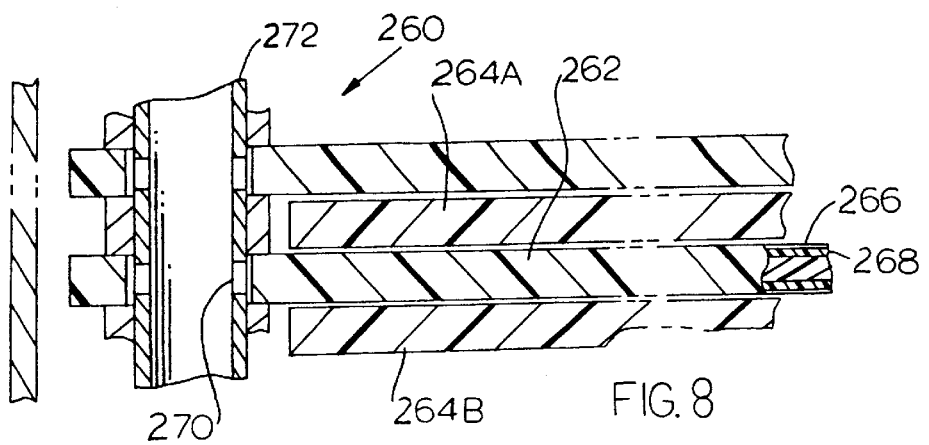
FIG. 8 is a partial sectional side view of a rotary filtration apparatus constructed in accordance with another embodiment of the invention.

FIG. 8 illustrates a portion of another rotary filtration apparatus 160 which is similar to that of FIGS. 1–6, except that the separator elements 162 which lie between adjacent rotating membrane pack 164A, 164B, also form membrane packs. That is, each separator member 162 has membrane sheets 166 and flow sheets 168 for removing permeate. Permeate passing through a membrane pack separator member 162 passes through a hole 170 in a hollow tying member 172 which is comparable to the tying members 70 of FIG. 2, to remove the permeate.

In one system that applicant has designed, the membrane packs had diameters of 16 inches (40 cm), and the gaps 40 were 3 mm thick, with the other dimensions being relative to the diameter, as shown in FIG. 2. In one application, aluminum oxide particles (originally used for dyes) of a size of 0.5 microns and up, were to be removed from a waste stream of salt water and dissolved solids. The aluminum oxide particles were to be concentrated from four percent to twenty percent of the volume of the stream, by removing the salt water and dissolved solids which constitute the permeate of the waste stream. Larger particles had been previously removed by settling and screening, so the largest particles were no more than about 10 microns in diameter. The feed fluid is initially maintained at a pressure of 40 psi and the membrane packs are rotated at 800 rpm. As the concentration increases, the pressure can be maintained constant, or can be increased slightly. Thus, after the concentration increases, the speed is increased to 1,000 rpm and the pressure is increased to 50 psi.

Thus, the invention provides a filtration system wherein feed fluid moves through axially thin gaps between membrane packs and separator elements. The system obtains advantages of a serial connection of the gaps, of a long flow path along the membrane surfaces, while avoiding disadvantages of widely varying pressure and particle concentration. The system includes a feed conduit that connects to the radially outer ends of the gaps, to allow fluid to flow in a loop through each gap, and to promote homogeneous fluid throughout the system. The separator elements preferably have through apertures to leave spokes.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for operating a rotary filtration apparatus which includes rotating about an axis, a stack of membrane packs that have rotating pack surfaces and that lie within a container, while maintaining a stack of substantially stationary separator elements so each of said separator elements lies between a pair of said membrane packs, and with each element having element surfaces, with said packs and elements leaving gaps between said rotating pack surfaces and said element surfaces, including a first gap between a first rotating pack surface of a first of said membrane packs and a first element surface of a first of said elements, and feeding a feed fluid that is to be separated into permeate and concentrate into said container to lie in said gaps, comprising:

flowing some of said feed fluid at least partially radially inwardly along inward paths that lie in said first gap and that lie adjacent to locations on said first element, with substantially all of the feed fluid that lies adjacent to said first element and in said first gap flowing with a radially inward directional component rather than radially outwardly;

flowing some of said feed fluid at least partially radially outwardly along outward paths that lie in said first gap and that lie adjacent to said rotating pack surface of said first membrane pack, with substantially all of the feed fluid that lies adjacent to said rotating pack surface and in said first gap flowing with a radially outwardly directional component rather than radially inwardly, while flowing some of the permeate from said feed fluid into said first membrane pack and from it into a permeate conduit, where at least some of said inward and outward paths lie at substantially the same locations over said first element; and flowing a portion of said feed fluid that has flowed both radially inwardly and radially outwardly along said inward and outward paths within said first gap, into a feed conduit that connects to a plurality of said gaps.

2. The method described in claim 1 wherein:

said feed conduit lies within said vessel, extends at least partially in an axial direction, and lies radially outward of said stack of membrane packs; and including flowing said feed fluid at least partially axially along said feed conduit, and flowing feed fluid both from said feed conduit into each of said plurality of gaps and from each of said plurality of gaps into said feed conduit.

3. The method described in claim 1 including:

commencing a process to clean said membrane packs of said stack;

allowing particles of said feed fluid to build up on said rotating pack surfaces, but only to a thickness that is less than one-tenth the thickness of the gap between each of said rotating pack surfaces and the adjacent one of said element surfaces, before said step of commencing a process to clean said membrane packs of said stack.

4. Filtration apparatus which includes a container, a shaft lying on an axis and extending into said container and a bearing apparatus that rotatably supports said shaft in rotation with respect to said container, a stack of spaced membrane packs mounted on said shaft and lying in said container with each pack having an inside for carrying filtered fluid, an outlet coupled to the insides of said packs for carrying away filtered fluid, a stack of substantially stationary separator elements lying in said container with each element lying between a pair of said membrane packs to leave a gap between them that forms radially inner and outer gap ends, a motor connected to said shaft to rotate it and said stack of membrane packs about said axis, and a feed inlet coupled to the inside of said container to flow feed fluid therein, characterized by:

a feed conduit lying in said container and connected to said feed inlet and connected to about 360° of said radially outer ends of said gaps, said feed conduit extending around said outer ends of said gaps to connect said radially outer ends of substantially all of said gaps together so said feed fluid can flow from locations of said feed conduit into said gaps and from said gaps back into the same locations of said feed conduit, with said gaps being substantially blocked from the direct inflow of feed fluid from outside said container into slid radially inner gap ends, so substantially all feed fluid flowing into said gaps flows from said feed conduit into said gaps.

5. The filtration apparatus described in claim 4 wherein:

said separator elements include at least one middle separator element that lies between first and second of said membrane packs, said middle separator element having first and second opposite faces respectively facing said first and second membrane packs, said middle separator element having a plurality of through apertures which connect its faces;

said middle separator element and a plurality of said apertures therein, each extend radially beyond said first and second membrane packs, to facilitate the flow of feed fluid between said feed conduit and said gaps with said apertures lying over at least 10% of the area of said first and second membrane packs.

6. The filtration apparatus described in claim 4 wherein:

said rotor includes a shaft that has a permeate conduit, with said filter packs each being connected to said permeate conduit to flow permeate of said feed fluid thereto;

said shaft has axially opposite end portions projecting from axially opposite ends of said container, and said permeate conduit extends through both of said shaft end portions, to flow permeate out through both ends of said shaft.

7. The filtration apparatus described in claim 4 wherein:

at least some of said elements are membrane pack elements, with each of said membrane pack elements including a membrane sheet facing a corresponding gap and also including a flow sheet that backs the membrane sheet and that forms a permeate passage.

8. The filtration apparatus described in claim 4 wherein:

said gaps have radially inner portions, and said gap radially inner portions are connected together but are blocked from the outflow of fluid from said container except along paths extending radially outwardly along said gaps.

9. Filtration apparatus which includes a container, a shaft lying on an axis and extending into said container, a stack of spaced membrane packs mounted on said shaft and lying in said container, a stack of substantially stationary separator elements lying in said container with each element lying between a pair of said membrane packs to leave a gap between them, a motor connected to said shaft to rotate it and said stack of membrane packs about said axis, and a feed inlet coupled to the inside of said container to flow feed fluid therein, wherein:

at least one of said separator elements has a plurality of through apertures which occupy at least 10% of the area of the separator elements and has a plurality of wall portions including wall portions on opposite sides of each aperture, to equalize fluid pressure at opposite faces of said predetermined separator element, whereby to avoid pressure-caused deflection of said separator element.

10. The filtration apparatus described in claim 9 wherein:

said predetermined separator element has four imaginary sectors, each subtending an angle of 90° about said axis, and has separator walls in each of said sectors, and said plurality of apertures includes an aperture in each of said sectors, which occupies at least 10% of the area of the sector.

11. The filtration apparatus described in claim 9 wherein:

said predetermined separator element and said apertures therein, both extend from at least one half the radius of said membrane packs and further radially outwardly than said membrane packs, to facilitate feed flow between a pair of said gaps and a portion of the inside of said container that lies around said membrane packs.

12. The filtration apparatus described in claim 9 wherein:

said predetermined separator element includes a plurality of largely radially-extending spokes formed between said apertures, and includes a 360° continuous hub near the radial center of said element and a continuous rim near the radial periphery of said element, to support each of said spokes.

13. The filtration apparatus described in claim 9 wherein:

said motor is constructed to rapidly rotate said shaft so the velocity of the periphery of said membrane packs with respect to adjacent portions of said separator elements is at least 4 meters per second;

said predetermined separator element lies between first and second of said membrane packs;

said plurality of apertures in said particular separator element extend largely radially to form spokes between said apertures, and said spokes are constructed to aerodynamically center themselves between said first and second membrane packs in a stream of said feed fluid that rapidly moves past said spokes as said membrane packs rapidly rotate.

14. The filtration apparatus described in claim 9 wherein:

said apertures comprise between 4 and 16 largely radially-extending apertures extending along most of the radius of said predetermined separator element, to leave between 4 and 16 spokes between said apertures.

15. Filtration apparatus which includes a container, a shaft lying on an axis and extending into said container, a stack of spaced membrane packs mounted on said shaft and lying in said container, a stack of substantially stationary separator elements lying in said container with each element lying between a pair of said membrane packs to leave a gap between them, a motor connected to said shaft to rotate it and said stack of membrane packs about said axis, and a feed inlet coupled to the inside of said container to flow feed fluid therein, characterized by:

each of a plurality of said separator elements includes a plurality of spokes extending largely radially, with radially outer ends coupled to said container and with radially inner ends, and a hub portion that connects said radially inner ends of said spokes to each other.

16. The filtration apparatus described in claim 15 wherein:

said plurality of spokes includes at least 4 spokes, and said hub portion extends continuously along 360° around said axis.

17. Filtration apparatus comprising:

walls forming a substantially cylindrical stationary container having an axis;

a rotor which includes a stack of axially spaced membrane packs that lie in said container, and which includes a shaft that projects out of said container;

a motor connected to said shaft to rotate it about a rotation axis;

a stack of stationary separator elements lying in said container, with each of plurality of said separator elements lying between but spaced from a pair of said membrane packs, to leave a gap between each membrane pack and each separator element:

said container forms a feed conduit lying radially outside largely 360° of said membrane packs as viewed along said axis, that connects together the radially outer edges of said gaps, to flow feed fluid from locations of said feed conduit into said gaps and out of said gaps into said locations of said feed conduit, with said gaps having radially inner portions lying at and immediately around said rotation axis;

said radially inner portions of said gaps are substantially blocked from the direct inflow of feed fluid from outside said container into said radially inner portions of said gap.

18. The filtration apparatus described in claim 17 including accumulator means connected to said feed conduit for automatically maintaining a substantially constant feed fluid pressure, to assure that the pressure decreases only gradually.

* * * * *